United States Patent

Agrawal et al.

[11] Patent Number: 5,953,936
[45] Date of Patent: Sep. 21, 1999

[54] DISTILLATION PROCESS TO SEPARATE MIXTURES CONTAINING THREE OR MORE COMPONENTS

[75] Inventors: Rakesh Agrawal, Emmaus; Zbigniew Tadeusz Fidkowski, Macungie, both of Pa.

[73] Assignee: Air Products and Chemicals, Inc., Allentown, Pa.

[21] Appl. No.: 08/958,893

[22] Filed: Oct. 28, 1997

[51] Int. Cl.⁶ ........................................ F25J 3/00
[52] U.S. Cl. ............................ 62/630; 62/643; 62/924; 62/927
[58] Field of Search ............................ 62/620, 630, 643, 62/924, 927, 928, 929, 930

[56] References Cited

U.S. PATENT DOCUMENTS

| | | | |
|---|---|---|---|
| 3,074,245 | 1/1963 | Becker | 62/928 X |
| 4,246,073 | 1/1981 | Umeda et al. | 203/25 |
| 4,352,685 | 10/1982 | Swallow | 62/927 X |
| 4,415,345 | 11/1983 | Swallow | 62/927 X |
| 4,435,198 | 3/1984 | Gray | 62/927 X |
| 4,559,070 | 12/1985 | Sweet | 62/927 X |
| 4,710,212 | 12/1987 | Hanson et al. | 62/927 X |
| 4,759,786 | 7/1988 | Atkinson et al. | 62/929 X |
| 5,289,688 | 3/1994 | Agrawal | 62/643 |
| 5,617,741 | 4/1997 | McNeil et al. | 62/927 X |
| 5,692,395 | 12/1997 | Agrawal et al. | 62/927 X |

FOREIGN PATENT DOCUMENTS

| | | | |
|---|---|---|---|
| 628906 | 10/1961 | Canada | 62/929 |
| 658973 | 3/1963 | Canada | 62/930 |
| 2154965 | 5/1973 | Germany | 62/930 |

OTHER PUBLICATIONS

Z. Fidkowski and L. Krollikowski, "Minimun Energy Requirements of Thermally Coupled Distillation Systems" AIChE.Journal, Apr. 1987, vol. 33, No. 4, p. 643.

E. C. Hohmann, M. T. Sander and H. Dunford, "A New Approach to the Synthesis of Multicomponent Separation Schemes" Chem Eng. Commun., vol. 17, pp. 273–284.

Phillip C. Wankat and David P. Kessler, "Two–Feed Distillation: Same–Composition Feeds with Different Enthalpies", Ind. Eng. Chem.Res. 1993, 32, 3061–3067.

Rakesh Agrawal, "Synthesis of Distillation Column Configuration for a Multicomponent Separation" Ind. Eng.Chem. Res. 1996, 35, 1059–1071.

Zbigniew T. Fidkowski and Rakesh Agrawal, "Utilization of Waste Heat Stream in Distillation" Ind. ENg. Chem. Res., 1996, 34, 1287–1293.

L. R. Lynd and H. E. Grethlein, "Distillation with Intermediate Heat Pumps and Optimal Sidestream Return" AIChE Journal, Aug. 1986, vol. 32, No. 8, 1347.

Primary Examiner—Christopher B. Kilner
Attorney, Agent, or Firm—Robert J. Wolff

[57] ABSTRACT

A technique is set forth to reduce the heat requirement of conventional distillation processes which separate feed mixtures containing three or more components. The technique provides a great deal of flexibility in adjusting the temperatures of the required utilities including a scenario where the heat requirement is reduced without a need for additional higher temperature (and more costly) heat utility. In this technique, when a liquid bottoms stream (or gaseous overhead stream) containing two or more components is sent from an earlier column to a subsequent column, then a return vapor (or liquid) stream is implemented between the same locations in the two columns.

4 Claims, 11 Drawing Sheets

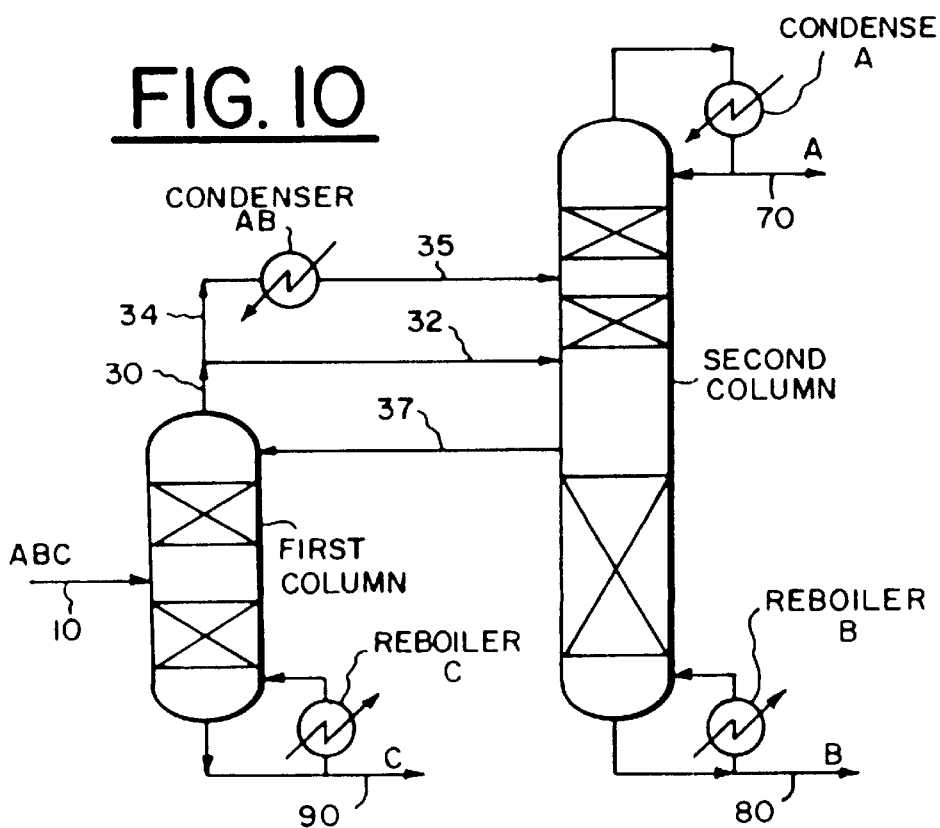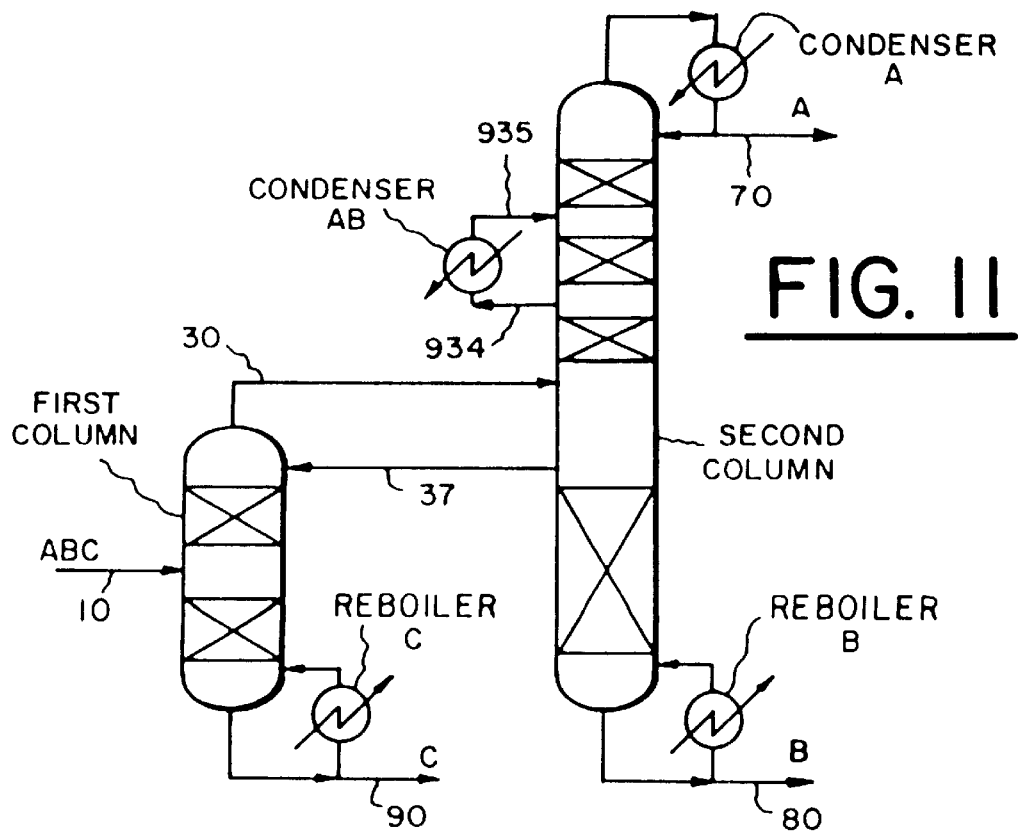

DISTILLATION PROCESS TO SEPARATE MIXTURES CONTAINING THREE OR MORE COMPONENTS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The objective of this invention is to suggest efficient distillation schemes to separate feed mixtures containing three or more components into product streams each enriched in one of the components. Generally the objective of a process engineer designing a distillation scheme is to make it more efficient by reducing the heat requirement of the distillation columns within the distillation scheme. However, it is well known that in a ternary or three component separation, attempts to reduce the heat requirement leads to the need for more heat utility at a higher temperature i.e. more heat has to be supplied by the higher temperature heat source. For an above ambient temperature distillation, this could mean that heat can be saved only if more higher temperature steam is used. A higher temperature steam is more expensive. Therefore, there is definitely a need for distillation schemes to decrease heat requirement without a need for any additional higher temperature heat utility or to allow more flexibility in adjusting the temperatures at which heat is supplied to the distillation columns. This invention fulfills this long desired need for improving the efficiency of multicomponent distillation without increased demand for more expensive utilities.

Consider the separation of a ternary mixture ABC into three product streams each enriched in one of the components. A is the most volatile component and C is the least volatile component. To separate a ternary mixture ABC into almost pure components it is required that a distillation scheme use two distillation columns. Such distillation schemes are well known in the art There are such five well known schemes: direct sequence, indirect sequence, side rectifier, side stripper and thermally coupled columns. Each of the schemes will now be described in detail:

FIG. 1 shows a direct sequence scheme. A feed mixture containing components A, B and C (stream 10) is fed to the first column having a condenser A and a reboiler BC where it is distilled to A-enriched product (stream 70) from the top. The liquid from the bottom of this column (stream 20) is primarily a binary mixture composed of components B and C. This BC liquid stream is split into two streams. A first portion (stream 22) is fed to the second column. The second portion (stream 24) is boiled and fed as stream 26 to the bottom of the first column. B-enriched product (stream 80) and C-enriched product (stream 90) are produced from the second column having a condenser B and a reboiler C. A portion of the C-enriched bottoms liquid is boiled (stream 92) and returned to the column to provide boil-up.

FIG. 2 shows an indirect sequence scheme. Distillation of the feed mixture (stream 10) in the first column having a condenser AB and a reboiler C produces C-enriched product (stream 90) from the bottom and a primarily binary vapor mixture AB (stream 30) from the top. A portion of this saturated vapor stream is fed to the second column (stream 32). Another portion (stream 34) is condensed and sent as reflux (stream 36) to the first column. A-enriched product and B-enriched product (streams 70 and 80 respectively) are produced from the second column having a condenser A and a reboiler B.

FIG. 3 shows a side rectifier scheme wherein the feed mixture ABC (stream 10) is distilled in the first column having a condenser A and a reboiler C to produce A-enriched product (stream 70) from the top and C-enriched product (stream 90) from the bottom. A portion of the C-enriched bottoms liquid is boiled (stream 92) and returned to the column to provide boil-up. The component of intermediate volatility, B, is collected (stream 80) from the top of the second column (also known as a side rectifier) having a condenser B. Notice that the second column does not have a reboiler at the bottom and instead it is fed by a vapor (stream 50) which is withdrawn from a location below the feed of the first column. This vapor stream is primarily a binary mixture consisting of components B and C. The liquid (stream 52) from the bottom of the second column is sent to the first column at the same location as where the vapor (stream 50) was removed from the first column. This thermal coupling between the two columns reduces the number of reboilers. As compared to the schemes in FIGS. 1 and 2, the number of reboilers is reduced by one, and the total number of reboilers and condensers used are three vs. four.

FIG. 4 shows a side stripper scheme which is similar to FIG. 3 (corresponding streams and equipment use the same identification) except that the feed to the second column (now known as side stripper) is a liquid (stream 60), product B (stream 80) is collected at the bottom of the second column instead of the top and the second column has a reboiler B but no condenser. The liquid stream is withdrawn from the first column from a location which is above the feed location to the first column and is primarily a binary mixture composed of components A and B and is fed to the top of the second column. The vapor (62) from the top of the second column is returned to the first column resulting in the thermal coupling between the two columns. Notice that as compared to the scheme in FIG. 2, one less condenser is used in FIG. 4.

FIG. 5 shows a thermally coupled columns scheme which uses two thermal couplings between the first and second columns, thereby eliminating both the reboiler and condenser in the second column. The thermal coupling at the bottom of the second column is the same as the one shown in FIG. 3 and at the top is the same as the one shown in FIG. 4 (corresponding streams and equipment use the same identification). B-enriched product (stream 80) is collected from an intermediate location of the second column. Notice that due to two-thermal coupling, the total number of reboilers and condensers is reduced by two.

By now it is well known that the schemes with thermal coupling (shown in FIGS. 3–5) require less heat input than the ones without thermal coupling (FIGS. 1 and 2) (Minimum Energy Requirements of Thermally Coupled Distillation Systems, Z. T. Fidkowski and L. Królikowski, AIChE Journal pages 643–653, volume 33, 1987). The heat requirement in the reboiler C of side rectifier in FIG. 3 is less than the total heat requirement in both reboilers BC and C of FIG. 1. Similarly, total heat input in reboilers B and C for the side stripper configuration in FIG. 4 is less than the total heat input in reboilers B and C of indirect sequence in FIG. 2. Of the five schemes, the thermally coupled configuration in FIG. 5 requires the least heat input in its reboiler, While the heat demand decreases with thermal coupling, it comes at a cost of more expensive utilities. For example, the thermally coupled scheme in FIG. 5 requires that all the hot utility be available at the highest temperature and all the cold utility be available at the coldest temperature. In a direct sequence scheme (FIG. 1), some heat is added to reboiler BC and some to reboiler C. The temperature of reboiler BC is lower than reboiler C which implies that the heat source for reboiler BC can be at a lower temperature than the heat source for reboiler C. On the other hand, all the heat input for thermally coupled column (FIG. 5) is to reboiler C and the total heat source has to be at the higher temperature. Similarly, in direct sequence scheme (FIG. 1), some heat is removed in condenser B which is warmer than condenser A. This implies that a cold utility used for condenser B can be warmer (and hence cheaper) than the cold utility used for condenser A. On the other hand, thermally coupled columns require that all the heat be removed by the more expensive cold utility in condenser A. This effect of more expensive utilities is also observed when side rectifier (FIG. 3) and side stripper (FIG. 4) configurations are compared with schemes in FIGS. 1 and 2. This prompted Hohmann et al. to state "thermal integration by direct vapor coupling will reduce the heat load on a network while increasing the relative temperatures of the sources (hot utility) and sinks (cold utility) required" (E. C. Hohmann, M. T. Sander and H. Dunford; A New Approach to the Synthesis of Multicomponent Separation Schemes, Chem. Eng. Commun. volume 17, pages 273–284, 1982). Therefore, the major challenge is how to reduce the total heat demand without too much compromising of the temperatures of the utilities.

For schemes such as the ones shown in FIGS. 1 and 2, suggestions have been made in the literature to further reduce the demand of the more expensive utility by trading some of this demand with less expensive utility (For example, see "Two-Feed Distillation: Same Composition Feeds with Different Enthalpies", by P. C. Wankat and D. P. Kessler in Ind. Eng. Chem. Res., volume 32, pages 3061–3067, 1993). In this suggestion, when a liquid (vapor) stream containing two or more components is boiled (condensed) in a reboiler (condenser), rather than feeding just one of the saturated liquid or the saturated vapor feed to the next column, it is desired that both the streams be fed to the next columns. An example for the direct sequence configuration of FIG. 1 is shown in FIG. 6. (Corresponding streams and equipment in FIGS. 1 and 6 use the same identification.) Now a portion of the saturated vapor exiting reboiler BC is sent as a second feed (stream 28) to the second column. The total quantity of the feed to the second column in FIG. 6 is identical to the one in FIG. 1. However, by transferring a portion of the feed as vapor to the second column, heat requirement for the reboiler C is decreased but the heat input in reboiler BC is increased by the same quantity. Therefore, the total heat input is unchanged but more of it can now be provided by using a lower temperature heat source. The corresponding solution for FIG. 2 is shown in FIG. 7. (Corresponding streams and equipment in FIGS. 2 and 7 use the same identification). Now a portion of the condensed stream from condenser AB is fed as a second feed (stream 38) to the second column. By having a portion of the feed to the second column as saturated liquid, demand for the condensing duty in the cold condenser A is decreased but the condensing duty need in the warmer condenser AB is increased by the same quantity. Once again more of the cold utility at warmer temperature can be used but the total need for cold utilities remains unchanged. Clearly, there is a need for alternative solutions which can reduce the total heat demand while providing some flexibility to decrease the need for warmer hot utility and/or colder cold utility.

The same challenge exists when mixtures containing more than three components are distilled to produce product streams each enriched in one of the components. The reason being that the distillation schemes used to distill mixtures with more than three components are made up of the ternary subschemes shown in FIGS. 1 through 7, Therefore deficiencies of the ternary subschemes are also carried to the distillation of mixtures containing a greater number of components. Some known examples of four and five component distillation schemes can be found in a paper by Agrawal (Synthesis of Distillation Column Configurations for a Multicomponent Separation, Ind. Eng. Chem. Res., volume 35, pages 1059–1071, 1996).

For the distillation of binary mixtures, use of an intermediate reboiler or an intermediate condenser is well known to improve the efficiency of the distillation. (For example, see a paper by Z. T. Fidkowski and R. Agrawal, Utilization of Waste Heat Stream in Distillation, Ind. Eng. Chem. Res. volume 34, pages 1287–1293, 1995.) However, it is also known that use of an intermediate reboiler does not decrease the overall heat required for binary distillation but decreases the heat input in the bottom reboiler by the amount of heat added to the intermediate reboiler.

BRIEF SUMMARY OF THE INVENTION

The present invention is a technique to reduce the heat requirement of conventional distillation processes which separate feed mixtures containing three or more components. The technique provides a great deal of flexibility in adjusting the temperatures of the required utilities including a scenario where the heat requirement is reduced without a need for additional higher temperature (and more costly) heat utility. In this technique, when a liquid bottoms stream (or gaseous overhead stream) containing two or more components is sent from an earlier column to a subsequent column, then a return vapor (or liquid) stream is implemented between the same locations in the two columns.

BRIEF DESCRIPTION OF THE SEVERAL VIEWS OF THE DRAWINGS

FIGS. 8 through 16 are drawings depicting various embodiments of the present invention's distillation process to separate mixtures containing three or more components.

DETAILED DESCRIPTION OF THE INVENTION

The present invention relates to the distillation of a feed stream containing three or more components into product streams enriched in the respective components. The present invention provides a method to reduce the heat requirement of the distillation while providing a great deal of flexibility in adjusting the temperatures of hot utilities and/or cold utilities. The present invention also provides the possibility to reduce the overall heat demand without changing the temperature of any of the utilities and while keeping the demand for the highest temperature hot utility and the lowest temperature cold utility at their minimum values.

The distillation of a feed stream in general and the distillation of a ternary feed stream in particular includes at least the following two general steps:

(a) feeding a feed stream to a first distillation column;

(b) removing a liquid (gas) stream enriched in the heavier (lighter) components of the feed stream from the first column at a location below (above) the feed location of the feed stream [generally the bottom (top) of the first column], feeding a first portion thereof to a second column, at least partially vaporizing (condensing) a second portion thereof and returning the at least partially vaporized (condensed) second portion to the first column as boil-up (reflux).

The present invention is a technique to reduce the heat requirement of the above process as it relates to a feed containing three or more components. The technique comprises removing a gaseous (liquid) stream from the second column at the feed location of the liquid (gaseous) stream and feeding it to the first column at the removal location of the liquid (gaseous) stream. The heat (refrigeration) that was formerly supplied to the first column via the at least partial vaporization (condensation) of the second portion of the liquid (gas) in step (b) is now more efficiently supplied to the second column via either:

(i) at least partially vaporizing (condensing) a portion of the liquid (vapor) stream prior to feeding it to the second column at least one separation stage [generally a couple of stages] below (above) the feed location of the remainder of the liquid (gaseous) stream; or (ii) adding heat (refrigeration) to the second column between the feed location of the liquid (gaseous) stream and the bottom (top) of the second column.

Figure 8:
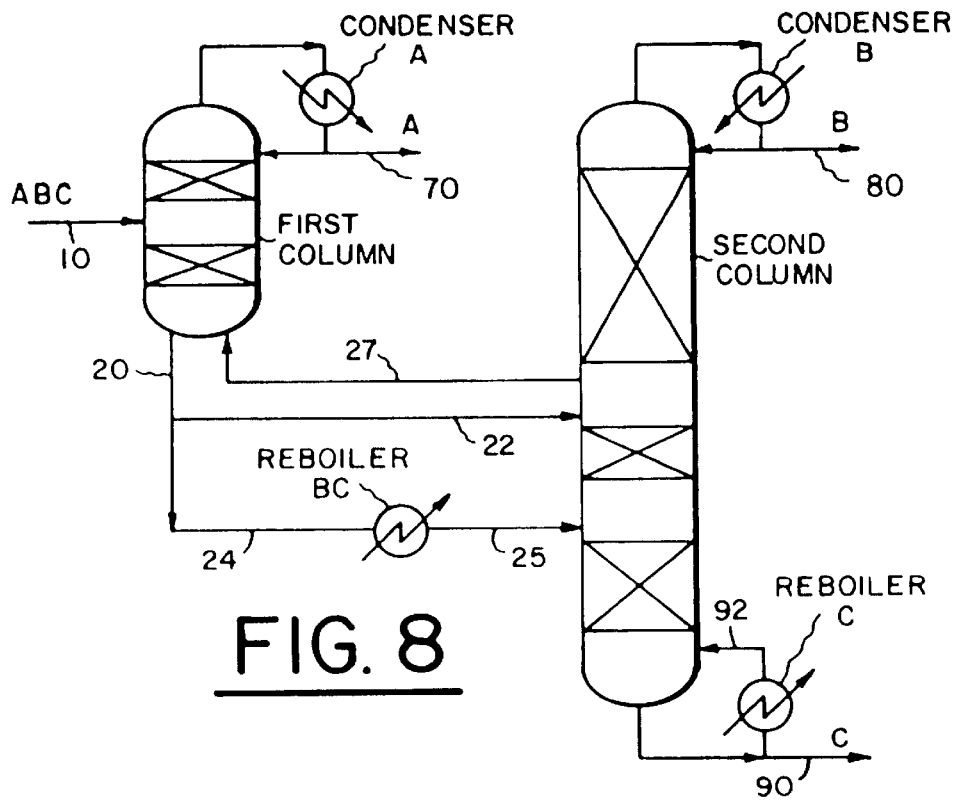

The present invention is best illustrated with respect to specific embodiments thereof such as those shown in FIGS. 8 through 16. FIG. 8 shows one embodiment as applied to FIG. 1 where transfer of a liquid enriched in the heavier components of the feed stream is involved. (Corresponding streams and equipment in FIGS. 1 and 8 use the same identification.) The heavier components-enriched liquid stream 20 is the bottoms liquid from the first column, This stream is primarily composed of heavier components B and C and a portion thereof (stream 22) is fed to the second column. A vapor (stream 27) is withdrawn from the second column at the same location as the feed location for stream 22 and fed to the bottom of the first column, In this particvular embodiment where only a portion of the heavier components-enriched liquid is transferred to the second column, the remaining portion (stream 24) is at least partially vaporized (preferably totally vaporized) in reboiler BC and the resulting stream 25 is fed at least one separation stage (generally a couple of stages) below the feed point of stream 22. The preferred feed location for stream 25 is such that the composition of the vapor phase matches with the composition of the vapor phase in the column.

Figure 9:
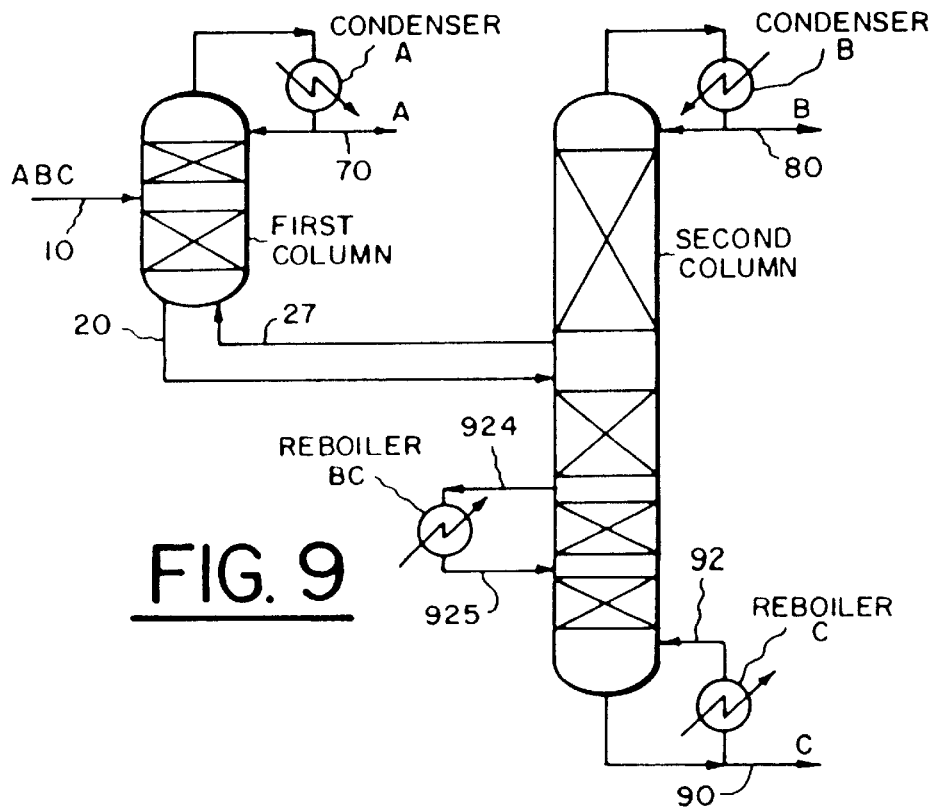

FIG. 9 is similar to FIG. 8 (corresponding streams and equipment use the same identification) except now the entire heavier components-enriched liquid stream 20 from the bottom of the first column is directly sent to the second column without any intervening vaporization step. In this variation, heat is to be added to the second column at a location which is intermediate between the feed point of stream 20 and the bottom of this column. The heat addition scheme shown in FIG. 9 is where a liquid stream 924 is withdrawn from a lower intermediate location in the second column and at least partially vaporized in reboiler BC and returned back to the second column. In this figure, the at least partially vaporized stream 925 is returned a couple of separation stages below the withdrawal location for liquid stream 924. Alternatively, stream 925 could be returned to the same location as the withdrawal location for liquid stream 924. In yet another alternative, if trays are used in the second distillation column, then heat could be directly added to the pool of liquid on the tray. Other methods of heat addition besides the scheme shown in FIG. 9 can be easily incorporated by those skilled in the art. The methods of heat addition to an intermediate location of a distillation column are well known. For example, they can be easily found in a paper by Lynd and Grethlein (Lynd, L. R. and Grethlein, H. E., "Distillation with Intermediate Heat Pumps and Optimal Sidestream Return", AlChE J, 32 (8) 1347 (1986)).

Figure 2:
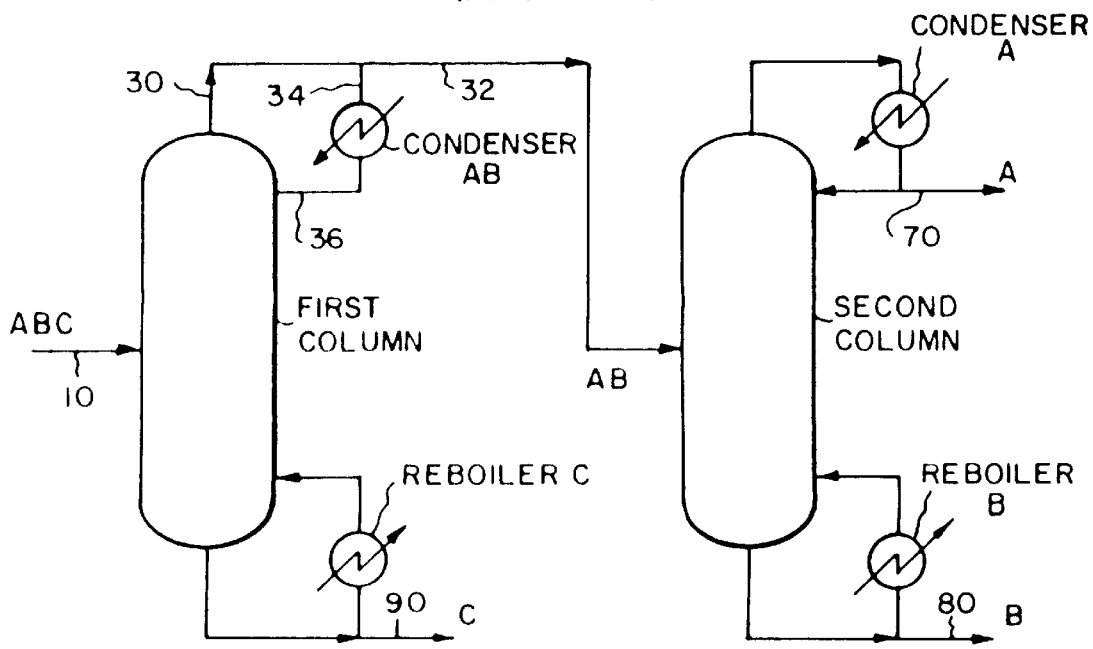

Now consider embodiments of the present invention where transfer of a gas enriched in the lighter components of the feed stream is involved. FIG. 10 shows one such embodiment as applied to FIG. 2. (Corresponding streams and equipment in FIGS. 2 and 10 use the same identification.) The lighter components-enriched vapor stream is overhead stream 30 from the first column. This stream is primarily composed of lighter components A and B. In this figure, a portion of the lighter components-enriched vapor stream 30 is fed as stream 32 to the second column. A liquid stream 37 is withdrawn from the second column at the same location as the feed location for stream 32 and fed to the top of the first column. In this particular embodiment where only a portion of the lighter components-enriched vapor is transferred to the second column, the remaining portion (stream 34) is at least partially condensed (preferably totally condensed) in condenser AB and the resulting stream 35 is fed at least one separation stage (generally a couple of stages) above the feed point of stream 32. The preferred feed location for stream 35 is such that the composition of the liquid phase matches the composition of the liquid phase in the column.

FIG. 11 is similar to FIG. 10 (corresponding streams and equipment use the same identification) except now the entire lighter components-enriched vapor stream 30 from the top of the first column is directly sent to th second column without any intervening condensation step. In this variation, heat is to be removed from the second column at a location which is intermediate between the feed point of stream 30 and the top of this column. The heat removal scheme shown in FIG. 11 is where a vapor stream 934 is withdrawn from an upper intermediate location in the second column and at least partially condensed in condenser AB and returned back to the second column. In this figure, the at least partially condensed stream 935 is returned a couple of separation stages above the withdrawal location for stream 934. Alternatively, stream 935 could be returned to the same location as the withdrawal location for stream 934. Other methods of heat removal besides the scheme shown in FIG. 11 can be easily incorporated by those skilled in the art.

Figure 12:
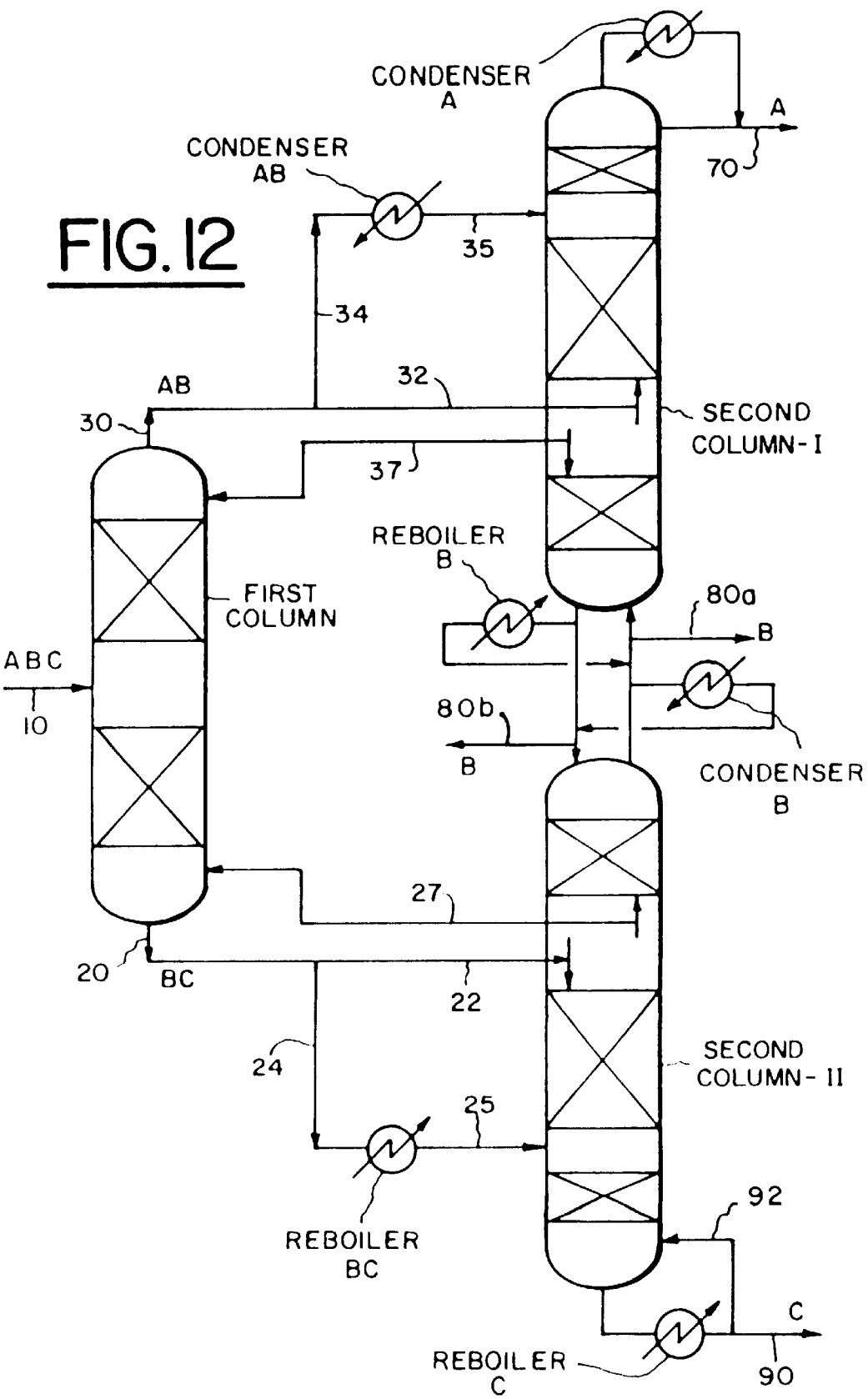

FIG. 12's embodiment is a combination of FIGS. 8 and 10 (corresponding streams and equipment use the same identification) in that both the heavier components-enriched liquid and the lighter components-enriched vapor streams are transferred from the first column to second columns. The first column produces lighter components-enriched vapor stream 30 from the top, and all of this stream is eventually fed to the second column-I as per FIG. 10. The first column also produces heavier components-enriched liquid stream 20 and this stream is then fed to the second column-Il as per FIG. 8. As shown in FIG. 12, product B can be removed as either a vapor (stream 80*a*) or liquid (stream 80*b*). Reboiler B and condenser B between the two second columns are optional.

Figure 13:
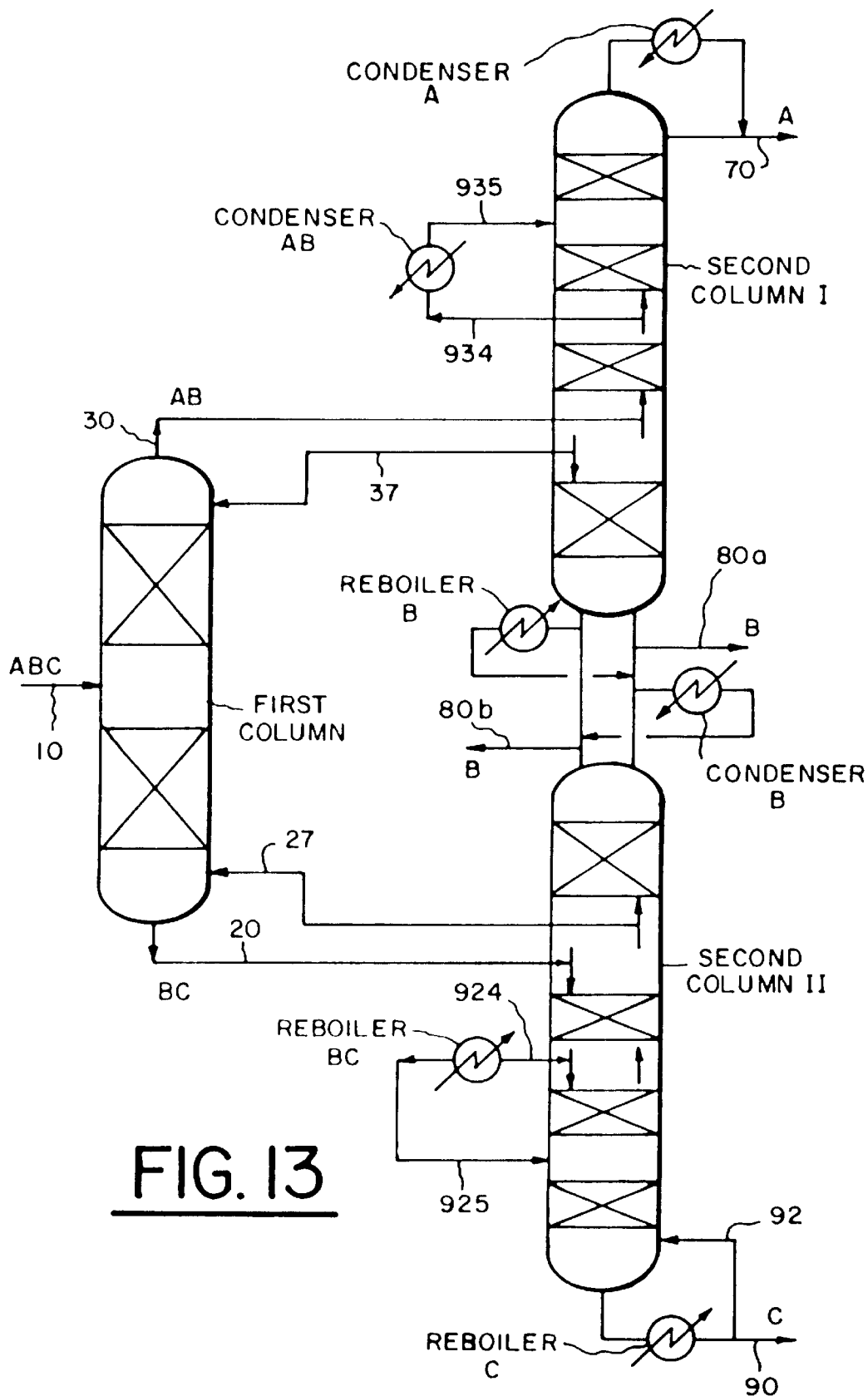

FIG. 13's embodiment is a combination of FIGS. 9 and 11 (corresponding streams and equipment use the same identification). Now heat is removed from the proper intermediate location of second column-I and heat is added at the proper intermediate location of second column-II. As shown in FIG. 13, product B can be removed as either a vapor (stream 80*a*) or liquid (stream 80*b*). Reboiler B and condenser B between the two second columns are optional.

Figure 14:
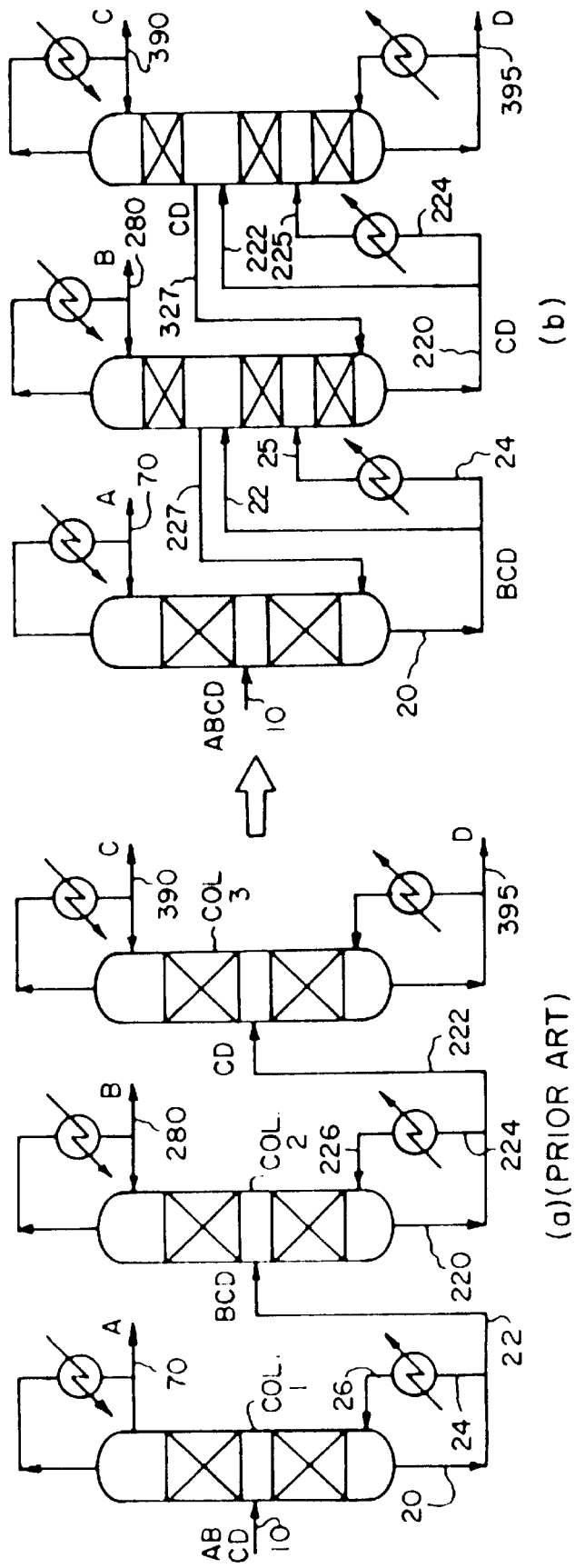
Figure 15:
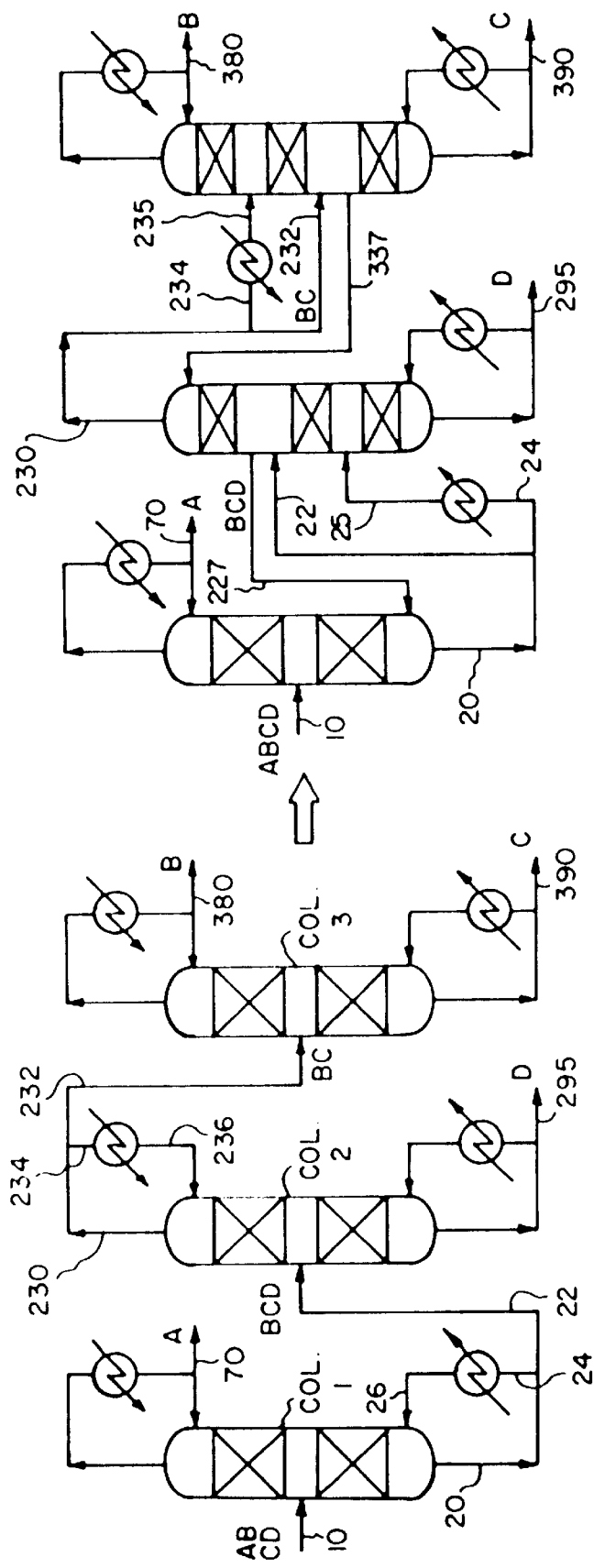
Figure 16:
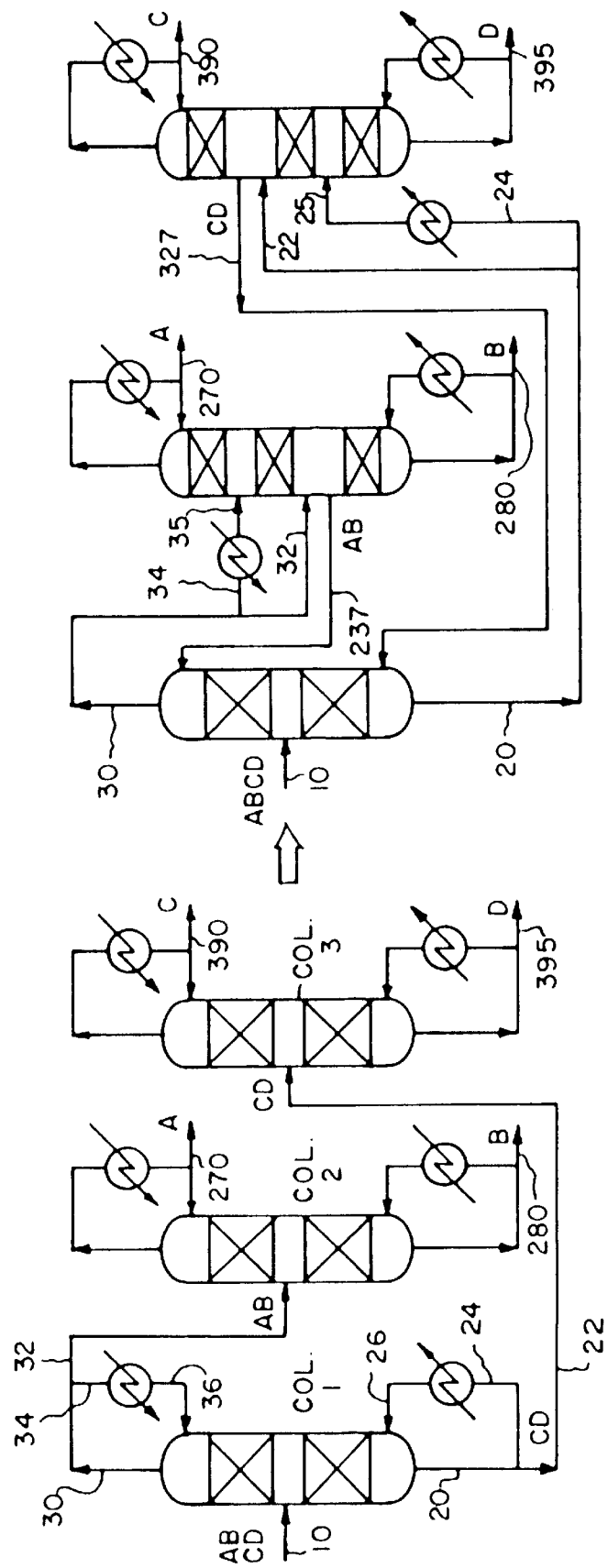

The concepts taught for the distillation of ternary mixtures can be easily extended to mixtures containing more than three components. They will now be illustrated for the distillation of four-component mixtures. FIGS. 14 through 16 show a conventional scheme on the left side and the corresponding improved scheme according to the current invention on the right side.

FIG. 14*a* shows a known direct sequence scheme to separate a four component feed mixture ABCD (stream 10) into four product streams each enriched in one of the components. In this mixture, the relative volatility follows the alphabetical order i.e., A is the most volatile and D is the least volatile. The first column separates the feed mixture into product A (stream 70) and a liquid stream 20 at the bottom which is rich in heavier components. Stream 20 is predominantly composed of B, C and D. A portion of this stream (stream 22) is sent to the second column and another portion (stream 24) is boiled and fed as stream 26 to the bottom of the first column. The second column separates the heavier components-enriched stream 22 from the first column into product B (stream 280) and even more heavier components-enriched liquid stream 220 at the bottom. This even more heavier components-enriched liquid stream is primarily composed of components C and D. A portion of stream 220 is sent as feed (stream 222) to the third column and another portion (stream 224) is boiled and fed as stream 226 to the second column. The third column separates the even more heavier components-enriched liquid stream 222 from the second column into product C (stream 390) and product D (stream 395).

An inspection of FIG. 14*a* reveals that there are two places where the current invention can be applied. They both occur when a heavier components-enriched liquid stream is transferred from an earlier column to the next column. Thus in FIG. 14*b*, the portion of the heavier components-enriched liquid stream 20 which is boiled (stream 24) is not sent to the bottom of the first column but sent to an intermediate location of the second column as stream 25. The boil-up to the first column is provided by a vapor stream 227 which is withdrawn from the same location of the second column as the feed point of the heavier components-enriched liquid stream 22. Similar modification is made for the even more heavier components-enriched liquid stream 220. Thus boiled stream 225 is sent to the third column and the boil-up to the second column is provided by stream 327 which is withdrawn from the same location of the third column as the feed location for lighter components-enriched vapor stream 222.

FIG. 15*a* shows another scheme to separate a four component mixture ABCD (stream 10) into four streams each enriched in one of the components. As in FIG. 14, the first column again separates the feed mixture into product A (stream 70) and a heavier components-enriched liquid stream 20, a portion of which (stream 22) is sent to the second column and another portion (stream 24) of which is boiled and fed as stream 26 to the bottom of the first column. The second column produces product D (stream 295) at the bottom and a lighter components-enriched vapor (stream 230) at the top, a portion of which (stream 234) is condensed and returned as reflux to the top of the column as stream 236 and another portion (stream 232) which is fed to the third column. The third column separates the lighter components-enriched vapor stream 230 from the second column into product B (stream 380) and product C (stream 390).

Applying the present invention to both streams 22 and 232 in FIG. 15*a* results in FIG. 15*b*. The heavier components-enriched liquid stream 20 from the bottom of the first column is primarily composed of components B, C and D. A portion of it is directly sent to the second colurin (stream 22) and another portion is boiled. The boiled stream 25 is not sent as boil-up to the first column but is sent to an intermediate location of the second column. The boil-up for the first column is provided by vapor stream 227 which is withdrawn form the second column at the same location as the feed location for heavier components-enriched liquid stream 22. The lighter components-enriched vapor stream 230 from the top of the second column is primarily composed of components B and C. A portion of it is directly sent to the third column (stream 232) and another portion is condensed. The condensed stream 235 is not sent as reflux to the second column but is sent to an intermediate location of the third column. The reflux for the second column is provided by liquid stream 337 which is withdrawn from the third column at the same location as the feed location for lighter components-enriched vapor stream 232.

FIG. 16*a* shows a scheme where the first column does not produce any product stream directly form the feed mixture ABCD (stream 10). Instead, the first column produces both the lighter components-enriched vapor stream 30 (primarily composed of A and B) from the top and the heavier components-enriched liquid stream 20 (primarily composed of C and D) from the bottom. A portion of vapor stream 30 (stream 34) is condensed and returned as reflux (stream 36) while another portion (stream 32) is fed to the second column where it is separated into product A (stream 270) at the top and product B (stream 280) at the bottom. Similarly, a portion of liquid stream 20 (stream 24) is condensed and returned as boil-up (stream 26) while another portion (stream 22) is fed to the third column where it is separated into product C (stream 390) at the top and product D (stream 395) at the at the bottom.

Applying the present invention to both streams 22 and 32 in FIG. 16*a* results in FIG. 16*b*. Condensed stream 36 is not sent as reflux to the first column but is sent to an intermediate location of the second column as stream 35. The reflux for the first column is provided by liquid stream 237 which is withdrawn from the second column at the same location as the feed location for lighter components-enriched vapor stream 32. Similarly, boiled stream 26 is not sent as boil-up to the first column but is sent to an intermediate location of the third column as stream 25. The boil-up for the first column is provided by vapor stream 327 which is withdrawn from the third column at the same location as the feed location for heavier components-enriched liquid stream 22.

Similarly there are other four-component distillation schemes where the current invention can be easily applied. It is also possible to modify schemes in FIGS. 14*a*, 15*a* and 16*a* using the idea of intermediate heat addition or intermediate heat removal from the next column as shown in FIGS. 9 and 11 for three component mixtures.

From the above discussion, application of the current invention to the separation of mixtures containing more than four components is obvious.

Some examples of feed streams which the present invention is applicable to include nitrogen/oxygen/argon mixtures, benzene/toluene/xylene mixtures, nitrogen/carbon monoxide/methane mixtures, any combination of 3 or more components from C1 to C5 alcohols or any combination of 3 or more components from C1 to C5 hydrocarbons.

Figure 1:
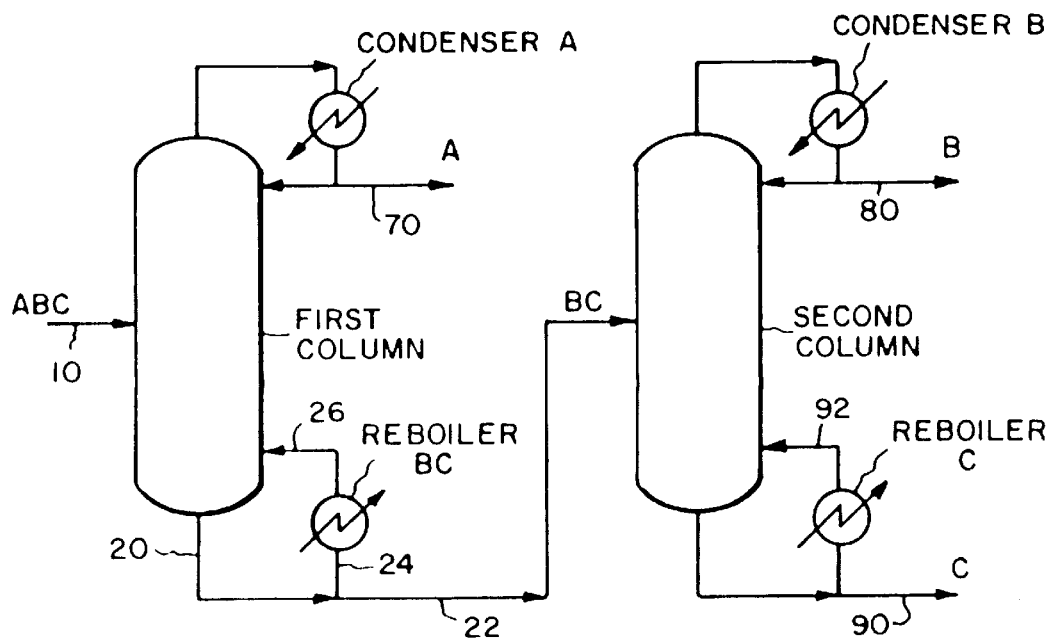
FIGS. 1 through 7 are drawing depicting various prior art distillation processes to separate mixtures containing three or more components.
Figure 3:
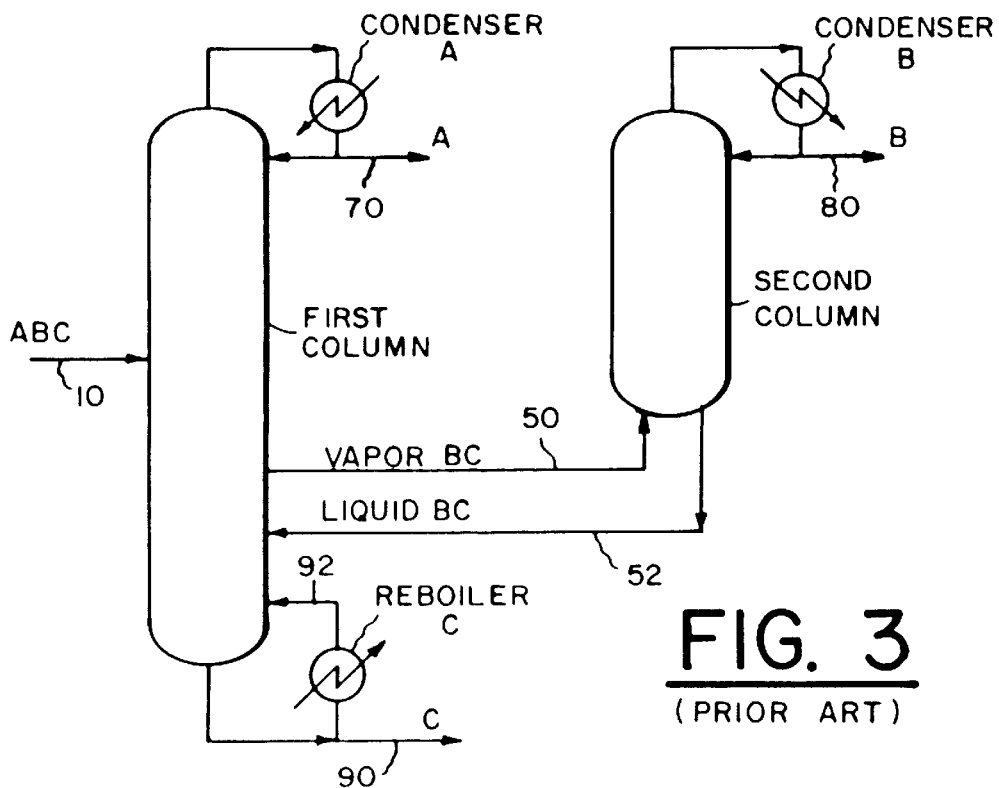
Figure 4:
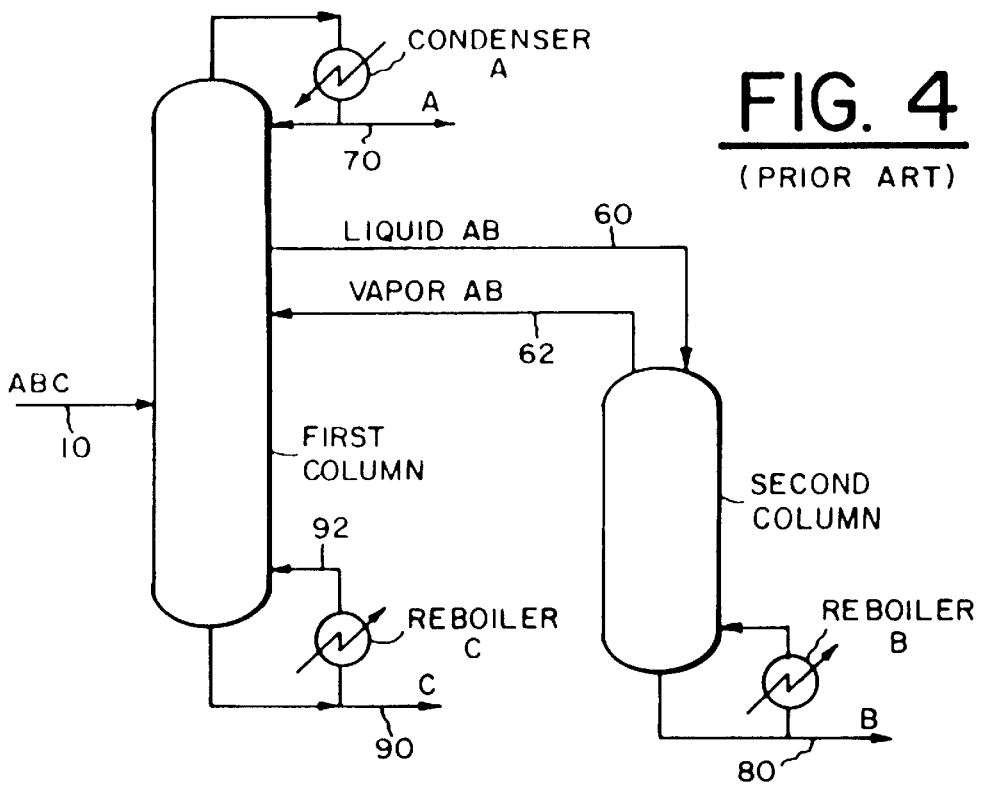
Figure 5:
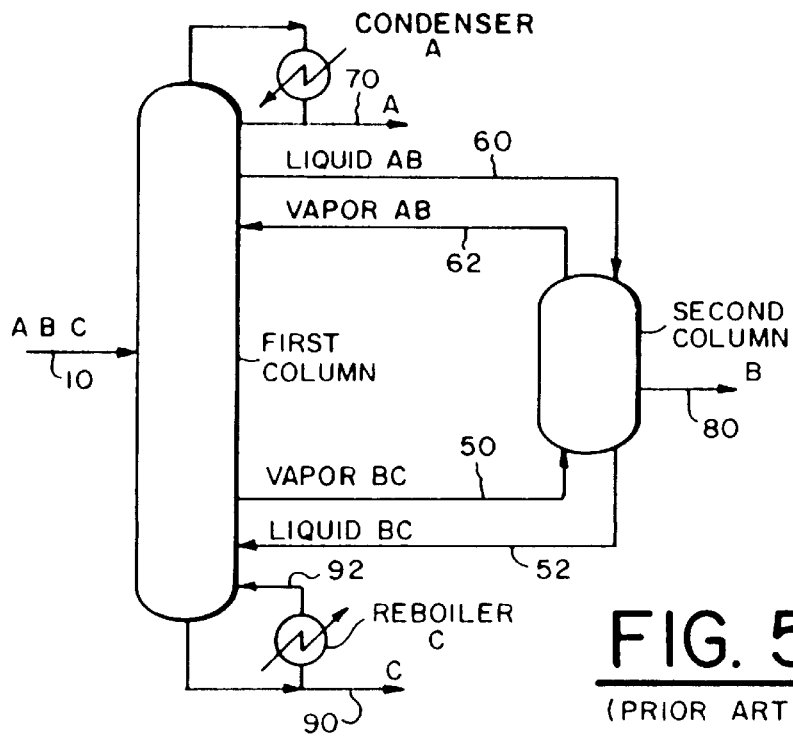
Figure 6:
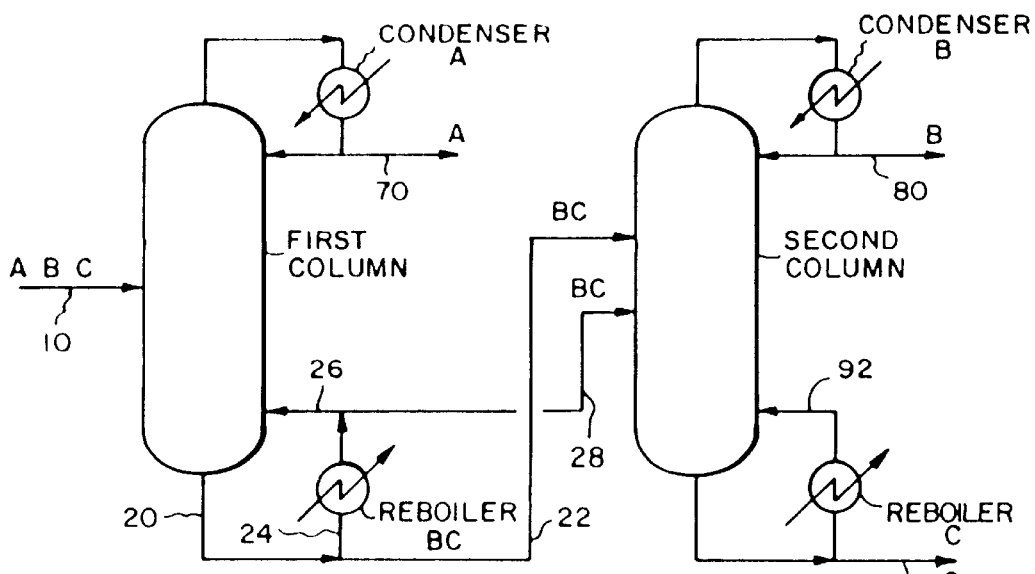
Figure 7:
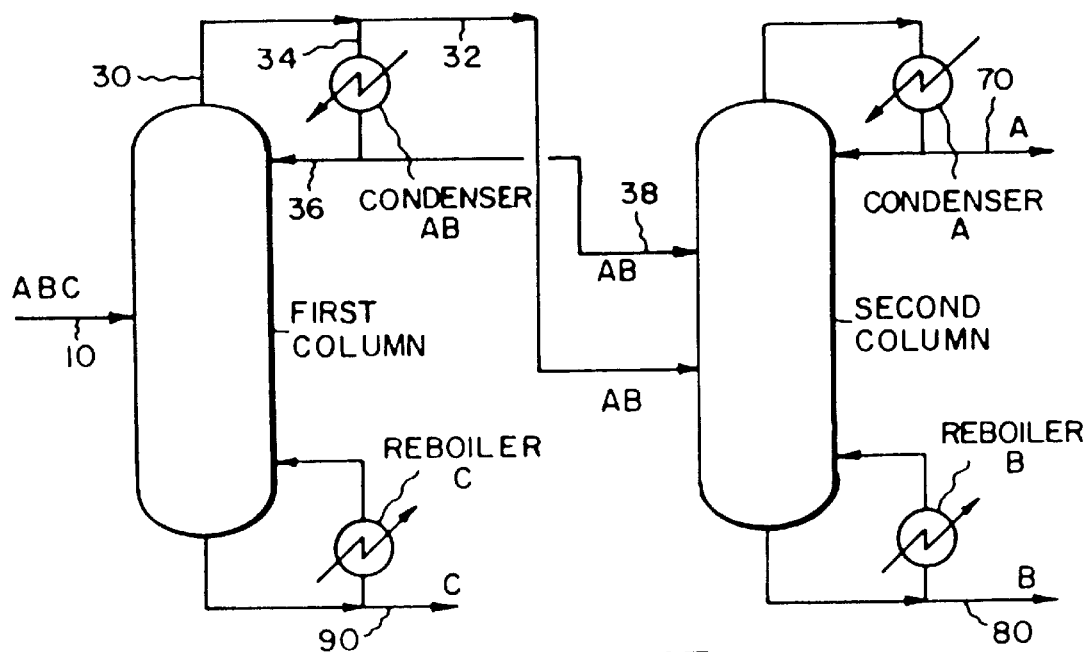

As noted previously, a prevailing wisdom in chemical engineering literature is that in order to decrease heat requirement of a distillation system, more heat is needed at higher temperatures. Some examples of such configurations are shown in FIGS. 1, 3, and 5. Configurations in FIGS. 3 and 5 require less heat than the configuration in FIG. 1, however, they demand that all the heat be supplied at one high temperature in reboiler C. This means that a more expensive heat source would be needed to achieve distillation in FIGS. 3 and 5. Some other solutions such as the one in FIG. 6 do not change the totalt heat demand but shift more heat from the higher temperature to the lower temperature. Thus, total heat requirements for configurations in FIG. 1 and 6 are same but in FIG. 6 less heat is supplied in reboiler C and more in reboiler BC.

The present invention breaks the existing paradigm by not only reducing the total heat demand but also by providing a great deal of flexibility in temperatures at which heat is provided. As shown in the following Example, FIG. 8's particular embodiment of the present invention requires less total heat than prior art FIGS. 1 and 6 with only slightly more heat at higher temperature of reboiler C. Furthermore, as compared to FIGS. 1 and 6, the FIG. 9's embodiment may be used such that no more heat is required in reboiler C and yet the total heat demand is decreased. This leads to substantial savings both in terms of the total heat demand and also the higher temperature (more expensive) heat source.

The following example is offered to demonstrate the efficacy of the present invention.

EXAMPLE

Separation of a three component mixture containing 33.3% A, 33.3% B and 33.4% C into pure components was considered. The relative volatility of A with respect to C was taken to be 10 and of B with respect to C was equal to 5. All three components were taken to have same latent heat. For each scheme calculations were done to achieve separation with minimum possible vapor flow. In other words, the total boil-up need was at its minimum. This is achieved by having columns pinched at feed locations. This allowed a fair comparison of heat duties between different schemes. The results are listed in Table 1. The basis of calculation in this table is feed flow of 1 mole. x is mole fraction in liquid phase and y is mole fraction in vapor phase; subscript indicates the mole fraction of the component under consideration. SL stands for saturated liquid while SV stands for saturated vapor.

Calculations were first done for the base flowsheet shown in FIG. 6. The needed heat duty in reboiler BC is to vaporize 1.353 moles of mixture containing 50% B (stream 24). The amount of liquid boiled in reboiler C is 0.167 moles (stream 92). The total vapor produced is 1.52 moles. Then calculations were done according to present invention for the flowsheet in FIG. 8. The amount of liquid vaporized in reboiler BC is now decreased to 1.103 moles (streams 24 and 25), and the amount of liquid vaporized in reboiler C has increased to 0.359 moles (stream 92). As compared to prior art flowsheet in FIG. 6 the total boil-up has decreased nearly 4% from 1.520 to 1.462.

Calculations were also done for the prior art process shown in FIG. 3. It is observed that all the boil-up for this process is provided in one reboiler C. The total vapor flowrate for this process is the same as for the present invention in FIG. 8. However, the temperature of the reboiler C is warmer than that in the reboiler BC. Mixture BC contains large fraction of B and component B is more volatile than C; this makes mixture BC vaporize at much lower temperature than component C. As a result, the heat duty for reboiler BC can be supplied by a heat source that is at a lower temperature than the heat source for reboiler C. A lower temperature heat source is cheaper than the higher temperature heat source. Therefore, the benefit of FIG. 8's embodiment of the present invention as compared to scheme in FIG. 3 is that a large fraction (about 75%) of the total heat can be provided by a cheaper lower temperature heat source.

When the process in FIG. 8 is compared with the conventional process in FIG. 6, it is observed that while a lower temperature heat source can now be used for reboiler BC (stream 24 has higher mole fraction of B in FIG. 8), more heat is needed in reboiler C. It means that while total demand for heat has decreased, a tradeoff for heat source has taken place. Some heat is needed at an even lower temperature (in reboiler BC) and more heat is needed at a higher temperature (in reboiler C). The process in FIG. 9 has a potential to adjust the temperature of the reboiler BC. By choosing the composition of stream 924 going to the reboiler BC to be the same as stream 24 in FIG. 6, the temperatures of both reboilers can be made equal. As a result, the temperature of heat source for reboilers BC in both FIGS. 6 and 9 will now be the same. For this specific case it is found that not only the total heat duty (streams 925 and 92 add to 1.462) is still low but also the heat needed in reboiler C (stream 92) is the same as in FIG. 6. It means that as compared to FIG. 6 total heat demand is decreased without any change in hot heat source temperatures.

TABLE 1

Example Calculations for Various FIGS.

| Stream Number and its Condition | | FIG. 6 | FIG. 8 | FIG. 3 | FIG. 9 |
|---|---|---|---|---|---|
| 20 | Flow | 1.687 | 1.687 | — | 1.687 |
|    | $x_B$ | 0.5 | 0.768 | — | 0.768 |
|    | State | SL | SL | — | SL |
| 24 | Flow | 1.353 | 1.103 | — | — |
|    | $x_B$ | 0.5 | 0.768 | — | — |
|    | State | SL | SL | — | — |
| 25 | Flow | — | 1.103 | — | — |
|    | $y_B$ | — | 0.768 | — | — |
|    | State | — | SV | — | — |
| 26 | Flow | 1.02 | — | — | — |
|    | $y_B$ | 0.5 | — | — | — |
|    | State | SV | — | — | — |
| 27 | Flow | — | 1.02 | — | 1.02 |
|    | $y_B$ | — | 0.943 | — | 0.943 |
|    | State | — | SV | — | SV |
| 92 | Flow | 0.167 | 0.359 | 1.462 | 0.167 |
|    | $y_C$ | 1 | 1 | 1 | 1 |
|    | State | SV | SV | SV | SV |
| 925 | Flow | — | — | — | 1.295 |
|    | $y_C$ | — | — | — | 0.5 |
|    | State | — | — | — | SV |
| Total Vapor Flow From All Reboilers | | 1.520 | 1.462 | 1.462 | 1.462 |

We claim:

1. A process for the distillation of a feed stream containing three or more components into product streams enriched in the respective components, said process comprising:
   (a) feeding the feed stream to a first distillation column;
   (b) removing a liquid stream enriched in the heavier components of the feed stream from the first column at a location below the feed location of the feed stream and either:
   (i) feeding a first portion of the liquid stream to a second column, partially vaporizing a second portion of the liquid stream and subsequently feeding the at least partially vaporized second portion to the second column at least one separation stage below the feed location of the first portion; or
   (ii) feeding the entire liquid stream to the second column without any intervening vaporization step and adding heat to the second column between the feed location of the liquid stream and the bottom of the second column;

(c) removing a gaseous stream from the second column at the feed location of the first portion of the liquid stream with respect to step (b)(i) or the feed location of the entire liquid stream with respect to step (b)(ii), and feeding the gaseous stream to the first column at the removal location of the liquid stream.

2. The process of claim 1 wherein said heat is added in step (b) (ii) via removing a liquid stream from the second column at a location between the feed location of the entire liquid stream and the bottom of the second column and at least partially vaporizing said liquid stream prior to returning it to the second column.

3. The process of claim 1 which further comprises:

(d) removing a second gaseous stream enriched in the lighter components of the feed stream from the first column at a location above the feed location of the feed stream and either:

(i) feeding a first portion of the second gaseous stream to the second column, partially condensing a second portion of the second gaseous stream and subsequently feeding the at least partially condensed second portion to the second column at least one separation stage above the feed location of the first portion; or (ii) feeding the entire second gaseous stream to the second column without any intervening condensation step and removing heat from the second column between the feed location of the second gaseous stream and the top of the second column;

(e) removing a second liquid stream from the second column at the feed location of the first portion of the second gaseous stream with respect to step (b)(i) or the feed location of the entire second gaseous stream with respect to step (b)(ii), and feeding the second liquid stream to the first column at the removal location of the second gaseous stream.

4. The process of claim 1 wherein the feed gas is a mixture selected from the group consisting of:

(a) a mixture comprising nitrogen, oxygen and argon; and
(b) a mixture comprising nitrogen, carbon monoxide and methane.

* * * * *